United States Patent
Shikuma et al.

(10) Patent No.: US 7,057,839 B2
(45) Date of Patent: Jun. 6, 2006

(54) MAGNETIC RECORDING APPARATUS (75) Inventors: Daisuke Shikuma, Kanagawa (JP); Kunihiro Komiya, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 137 days.

(21) Appl. No.: 10/395,250

(22) Filed: Mar. 25, 2003

(65) Prior Publication Data
US 2003/0142433 A1 Jul. 31, 2003

Related U.S. Application Data (63) Continuation of application No. 10/075,455, filed on Feb. 15, 2002, now abandoned.

(30) Foreign Application Priority Data
Feb. 15, 2001 (JP) .............................. 2001-037935

(51) Int. Cl.
*G11B 5/02* (2006.01)
(52) U.S. Cl. ...................................................... 360/67
(58) Field of Classification Search ................. 360/31, 360/66, 67, 68, 60; 324/210, 212; 340/650, 340/652
See application file for complete search history.

(56) References Cited

U.S. PATENT DOCUMENTS

| | | | |
|---|---|---|---|
| 6,429,987 B1 * | 8/2002 | Cheng | 360/68 |
| 6,466,388 B1 * | 10/2002 | Lacombe et al. | 360/68 |
| 6,775,078 B1 * | 8/2004 | Jiang | 360/67 |
| 6,794,880 B1 * | 9/2004 | Tucker | 324/210 |

* cited by examiner

*Primary Examiner*—David Hudspeth
*Assistant Examiner*—Glenda P. Rodriguez
(74) *Attorney, Agent, or Firm*—Morgan, Lewis & Bockius, LLP (57) ABSTRACT

A magnetic recording apparatus has a head for recording information on a magnetic recording medium, a write current setting circuit for controlling a write current that is passed through the head, a fault detection circuit for detecting a fault in the head based on the result of comparison between head voltages appearing at both ends of the head and a reference voltage, and a reference voltage setting circuit for varying the reference voltage according to the write current. This configuration permits correct detection of faults in the head all the time irrespective of the write current or the supply voltage.

10 Claims, 7 Drawing Sheets

MAGNETIC RECORDING APPARATUS

This application is a continuation application of Ser. No. 10/075,455 filed Feb. 15, 2002.

BACKGROUND OF THE INVENTION

1. Field of the Invention

The present invention relates to a magnetic recording apparatus having an inductive head as a means for recording information on magnetic recording medium (a flexible disk or the like).

2. Description of the Prior Art

Figure 6:
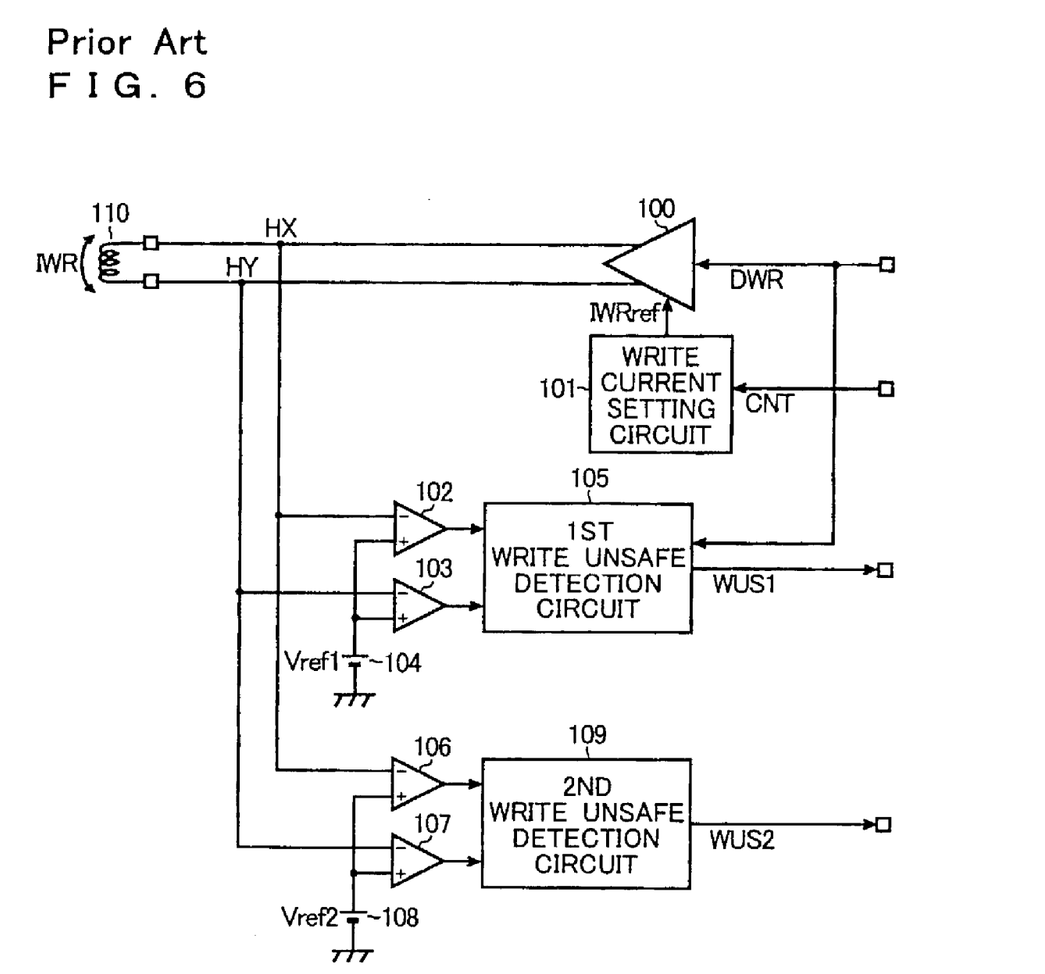
FIG. 6 is a block diagram showing an example of the configuration of a conventional magnetic recording apparatus.

FIG. 6 is a block diagram showing an example of the configuration of a conventional magnetic recording apparatus. In the magnetic recording apparatus shown in this figure, when information is going to be recorded on a magnetic recording medium, write data DWR is fed from a host (not shown) to a write driver 100. The write driver 100, on the basis of the write data DWR fed thereto, switches the direction of a write current IWR that is fed to an inductive head 110 (hereinafter referred to as the "head 110"). As a result of this operation, the magnetic recording medium is magnetized in the direction that conforms to the write current IWR flowing through the head 110, and in this way the writing of the write data DWR is achieved.

Here, the write current IWR is proportional to a control current IWRref fed from a write current setting circuit 101 to the write driver 100. The write current setting circuit 101 is a circuit that varies the control current IWRref (and thus the write current IWR) according to a control signal CNT fed from the host.

Moreover, the conventional magnetic recording apparatus is provided with many detection circuits, such as a first write unsafe detection circuit 105 (hereinafter referred to as the "first WUS circuit 105") having comparators 102 and 103 in the input stage thereof and a second write unsafe detection circuit 109 (hereinafter referred to as the "second WUS circuit 109") having comparators 106 and 107 in the input stage thereof. These many detection circuits are circuits that detect various faults in the head 110 on the basis of the results of comparison between head voltages HX and HY appearing at both ends of the head 110 and predetermined reference voltages (for the first and second WUS circuits 105 and 109, a first and a second reference voltage Vref1 and Vref2 respectively).

As shown in the figure, to the non-inverting input terminals (+) of the comparators 102 and 103 is connected a first direct-current voltage source 104 (the first reference voltage Vref1), and to the non-inverting input terminals (+) of the comparators 106 and 107 is connected a second direct-current voltage source 108 (the second reference voltage Vref2). Moreover, to the inverting input terminals (−) of the comparators 102 and 106 is connected one end of the head 110 (the head voltage HX), and to the inverting input terminals (−) of the comparators 103 and 107 is connected the other end of the head 110 (the head voltage HY). The output terminals of the comparators 102 and 103 are connected individually to the input terminals of the first WUS circuit 105, and the output terminals of the comparators 106 and 107 are connected individually to the input terminals of the second WUS circuit 109.

The first WUS circuit 105, on the basis of the results of comparison between the head voltages HX and HY and the first reference voltage Vref1, detects faults of an abnormally low frequency in the write data DWR, short-circuiting of the head 110 to the supply voltage Vcc, and short-circuiting of the head 110 to the ground voltage GND. These faults are detected by recognizing the trailing edges of back electromotive forces that appear in the head voltages HX and HY in response to the write data DWR. Therefore, it is necessary to set the threshold level of the comparators 102 and 103 (i.e. the first reference voltage Vref1) at the optimum value that permits as correct detection as possible of the various defects mentioned above. Alternatively, it is necessary to provide a plurality of circuits similar to those described above so that the optimum reference voltages for the detection of various faults can be set individually.

On the other hand, the second WUS circuit 109 latches the results of comparison between the head voltages HX and HY and the second reference voltage Vref2 in synchronism with the write data DWR, and detects a fault of the head 110 being brought into an open state on a logical basis according to the latched output. Here, the comparison operation by the comparators 106 and 107 involves simply detecting abnormal waveforms in the head voltages HX and HY, and therefore the setting of the threshold level of these comparators 106 and 107 (i.e. the second reference voltage Vref2) is not so critical as the setting of the first reference voltage Vref1 mentioned above. Therefore, the second reference voltage Vref2 is set at as high a voltage as possible (close to the supply voltage Vcc) so that trailing edges in the head voltages HX and HY can be detected without delay.

The first and second WUS circuits 105 and 109 feed the results of their respective fault detection described above in the form of fault detection signals WUS1 and WS2 to the host. When the host recognizes a fault in the head 110 on the basis of these abnormal detection signals WUS1 and WUS2, it performs an operation that ensures the writing to the magnetic recording medium (for example, a write-disable or reset operation).

Figure 7:
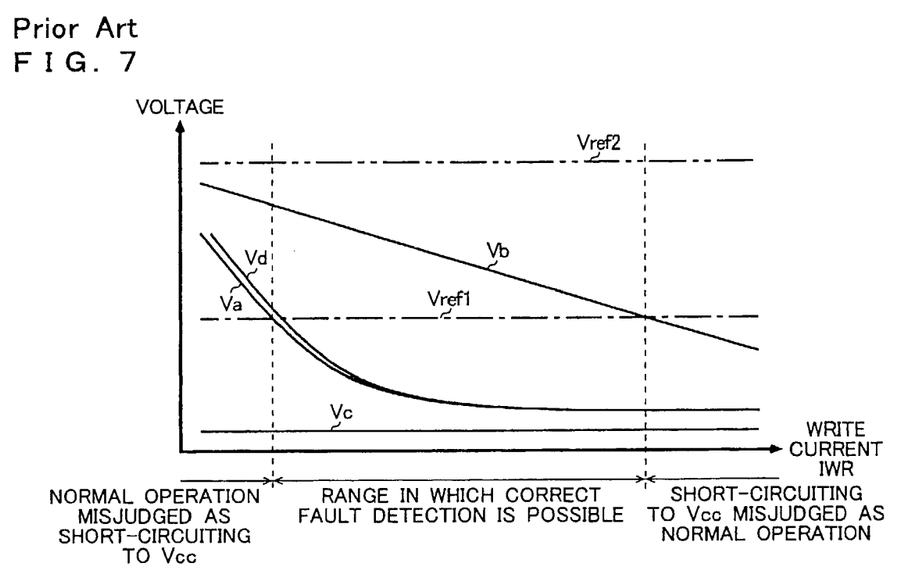
FIG. 7 is a diagram showing the relationship among the head voltages Va to Vd, the first and second reference voltages Vref1 and Vref2, and the write current IWR in the conventional magnetic recording apparatus.

FIG. 7 is a diagram showing the relationship among the head voltages Va to Vd, the first and second reference voltages Vref1 and Vref2, and the write current IWR in the conventional magnetic recording apparatus. In this figure, Va represents the peak voltage of trailing edges that appear in the head voltages HX and HY due to back electromotive forces, and Vb represents the short-circuit voltage that appears when one end of the head 110 is short-circuited to the supply voltage Vcc. Moreover, Vc represents the short-circuit voltage that appears when one end of the head 110 is short-circuited to ground, and Vd represents the open voltage that appears when the head 110 is brought into an open state.

As shown in the figure, the behavior of the head voltages HX and HY (as represented by the specific voltages Va to Vd they take) varies greatly depending on the write current IWR. By contrast, the first and second reference voltages Vref1 and Vref2, which are provided to permit the detection of faults in the head 110, are, as described above, kept constant, irrespective of the write current IWR. As a result, there exists a range within which the write current IWR is restricted to ensure correct detection of faults in the head 110. That is, quite inconveniently, if the write current IWR is varied out of the range, faults cannot be detected correctly.

Specifically, with the write current IWR larger than a predetermined value, the short-circuit voltage Vb associated with the supply voltage Vcc is lower than the first reference voltage Vref1. Thus, even if one end of the head 110 is short-circuited to the supply voltage Vcc, the head 110 is recognized as functioning normally. Conversely, with the write current IWR smaller than a predetermined value, the peak voltage Va associated with back electromotive forces is higher than the first reference voltage Vref1. Thus, even if the head 110 is functioning normally, it is recognized as being short-circuited to the supply voltage Vcc.

The behavior of the head voltages HX and HY varies also depending on the supply voltage Vcc, and therefore, just as with the write current IWR mentioned above, there exists also a range within which the supply voltage Vcc is restricted to permit correct detection of faults in the head 110.

Moreover, the conventional magnetic recording apparatus is so configured as to detect various faults in the head 110 on the basis of the results of comparison between the head voltages HX and HY appearing at both ends of the head 110 and at least two reference voltages (the first and second reference voltages Vref1 and Vref2), and is thus provided with at least two write unsafe detection circuit (the first and second WUS circuits 105 and 109) as a means for detecting faults. Thus, quite inconveniently, the conventional magnetic recording apparatus inevitably requires a large chip area and a large number of circuit elements at accordingly high cost.

SUMMARY OF THE INVENTION

An object of the present invention is to provide a magnetic recording apparatus that can detect faults correctly all the time irrespective of the write current through an inductive head or the supply voltage. Another object of the present invention is to provide a magnetic recording apparatus in which circuits for detecting faults in an inductive head (comparators and write unsafe detection circuits) have smaller circuit scales than their conventional counterparts.

To achieve the above objects, according to the present invention, a magnetic recording apparatus is provided with: a head for recording information on a magnetic recording medium; a write current setting circuit for controlling a write current that is passed through the head; a fault detection circuit for detecting a fault in the head based on the result of comparison between head voltages appearing at both ends of the head and a reference voltage; and a reference voltage setting circuit for varying the reference voltage according to the write current.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

As an example of a magnetic recording apparatus embodying the present invention, a flexible disk drive apparatus (hereinafter referred to as the "FDD apparatus") will be described. The FDD apparatus is an apparatus for recording information on and reproducing information from a flexible disk (hereinafter referred to as the "disk") through an inductive head. The FDD apparatus operates according to instruction signals from a host (CPU), and is controlled by a one-chip FDD control LSI provided within the FDD apparatus.

Figure 1:
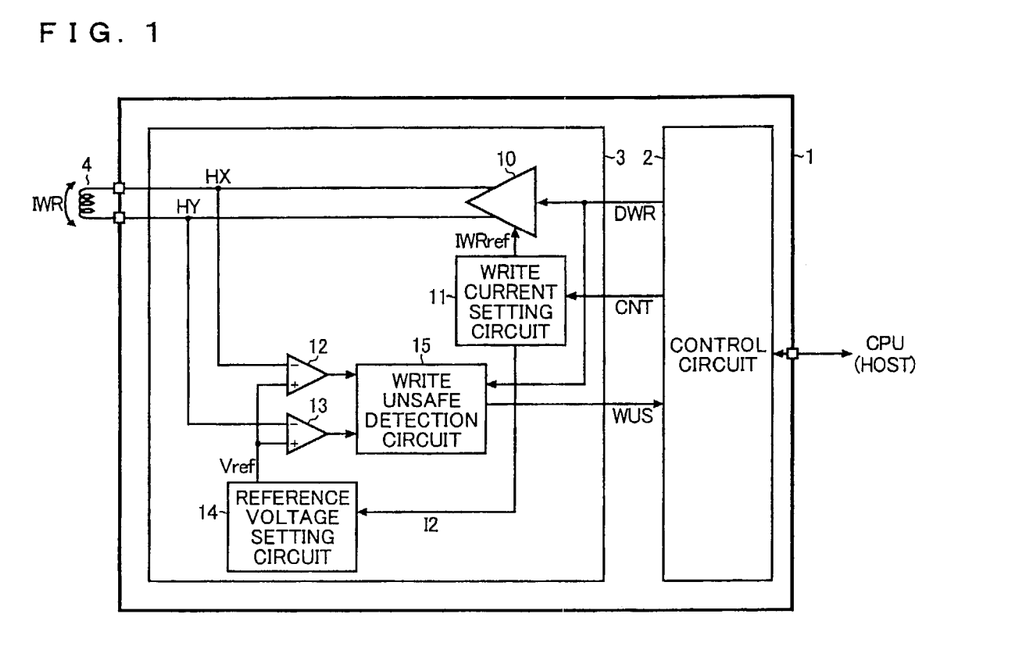
FIG. 1 is a block diagram showing the configuration of a principal portion of the FDD control LSI employed in an FDD apparatus embodying the invention.

FIG. 1 is a block diagram showing the configuration of a principal portion of the FDD control LSI employed in the FDD apparatus of this embodiment. As shown in this figure, the FDD control LSI 1 incorporates a control circuit 2 and a signal processing circuit 3. The control circuit 2 is a logic portion that controls the signal processing circuit 3 according to instruction signals and the like from the host (CPU).

The signal processing circuit 3 is a circuit that processes write data DWR that is to be written to the disk and read data (not shown) that has been read from the disk, and functions as a read/write portion that controls the operation of an inductive head 4 (hereinafter referred to as the "head 4") serving as an information recording/reproducing means.

The signal processing circuit 3 will be described in more detail. When information is going to be recorded on the disk, write data DWR is fed from the control circuit 2 to a write driver 10. The write driver 10, according to the write data DWR fed thereto, switches the direction of the write current IWR that is fed to the head 4. As a result of this operation, the disk is magnetized in the direction of the write current IWR through the head 4, and in this way the writing of the write data DWR is achieved.

The write current IWR mentioned above is proportional to a control current IWRref fed from a write current setting circuit 11 to the write driver 10. The write current setting circuit 11 is a circuit that varies the control current IWRref (and thus the write current IWR) according to a control signal CNT fed from the host (CPU). Moreover, the write current setting circuit 11 feeds a current 12 proportional to the control current IWRref to a reference voltage setting circuit 14, which will be described later.

Moreover, the FDD apparatus of this embodiment also incorporates a write unsafe detection circuit 15 (hereinafter referred to as the "WUS circuit 15") having comparators 12 and 13 in the input stage thereof. The WUS circuit 15 is a circuit that detects various faults in the head 4 on the basis of the results of comparison between head voltages HX and HY appearing at both ends of the head 4 and a reference voltage Vref, and that feeds the detection results in the form of a fault detection signal WUS to the host (CPU).

As shown in the figure, the non-inverting input terminals (+) of the comparators 12 and 13 are both connected to the output terminal of a reference voltage setting circuit 14. According to the current 12 fed from the write current setting circuit 11 and the supply voltage Vcc supplied to drive the FDD control LSI 1, the reference voltage setting circuit 14 produces a reference voltage Vref that is variable, and feeds the reference voltage Vref to the non-inverting input terminals (+) of the comparators 12 and 13.

The inverting input terminal (−) of the comparator 12 is connected to one end of the head 4, to which the head voltage HX is applied. On the other hand, the inverting input terminal (−) of the comparator 13 is connected to the other end of the head 4, to which the head voltage HY is applied. The output terminals of the comparators 12 and 13 are connected individually to the input terminals of the WUS circuit 15.

Thus, the head voltages HX and HY are individually compared with the reference voltage Vref by the comparators 12 and 13 respectively, and the comparison output from each comparator turns to a high level when the head voltage HX or HY is lower than the reference voltage Vref and to a low level when the head voltage HX or HY is higher than the reference voltage Vref.

Figure 2:
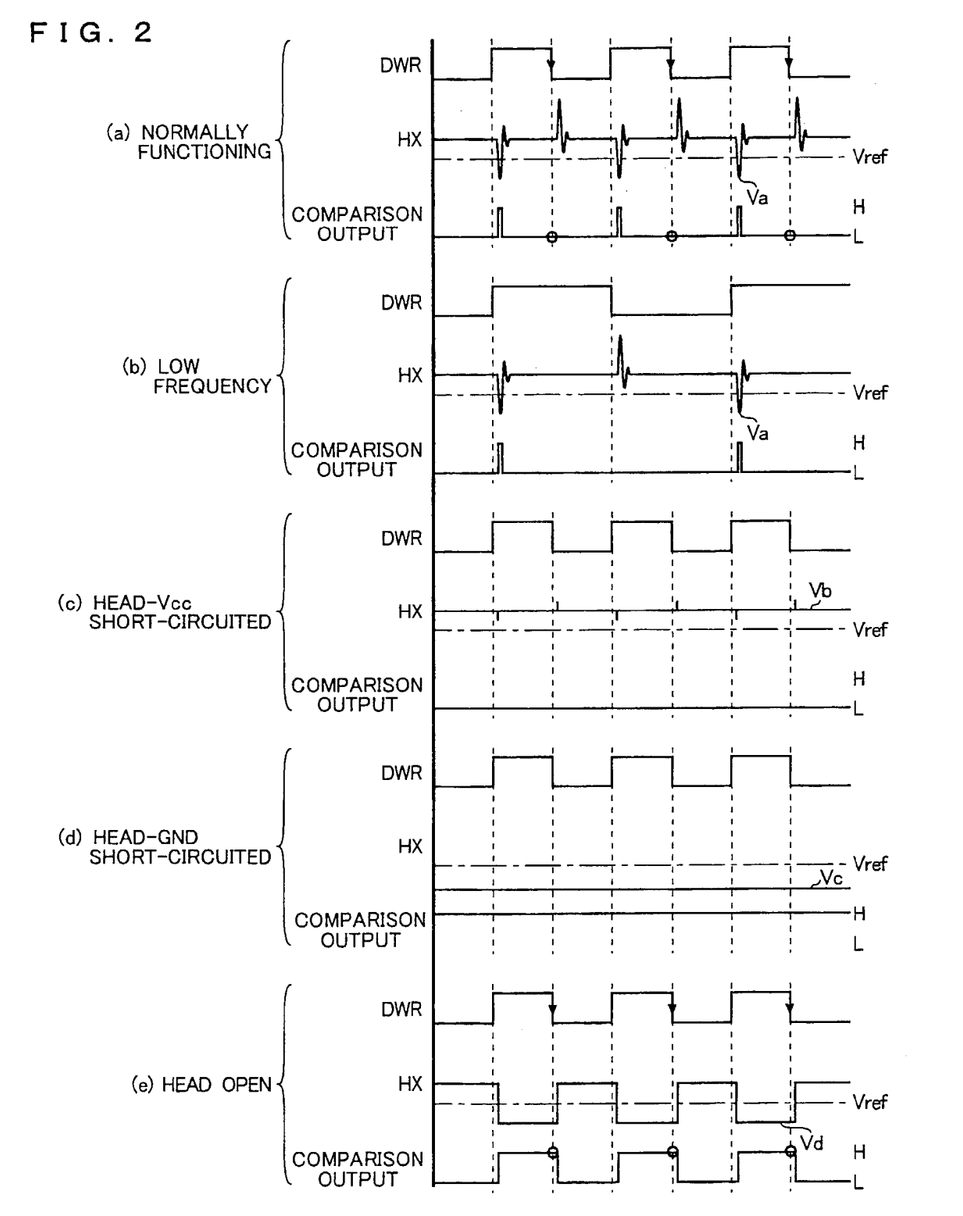
FIG. 2 is a timing chart showing examples of how faults in the head 4 are detected.

Next, how the WUS circuit 15 detects faults in the head 4 will be described. FIG. 2 is a timing chart showing examples of how faults in the head 4 are detected. In this figure, to simplify the explanations, only the head voltage HX is shown as the head voltage, and only the output of the comparator 12 is shown as the comparison output.

In the figure, at (a) is shown a state in which the head 4 is functioning normally. In this state, in the head voltage HX appear pulses of back electromotive forces in response to and with a slight delay relative to rising and trailing edges in the write data DWR. Here, the peak voltage Va of the trailing edges of the back electromotive forces is lower than the reference voltage Vref, and therefore the output of the comparator 12 turns to a high level in response to the trailing edges of the back electromotive forces. According to the specifications of the magnetic recording apparatus, a minimum value is set for the frequency of the write data DWR. Therefore, as long as the frequency of the write data DWR is normal, the output of the comparator 12 turns to a high level at intervals within a predetermined interval. Moreover, the back electromotive forces that appear in the head voltage HX have very small pulse widths, and therefore, when the output of the comparator 12 is latched, the latched output remains at a low level all the time.

In the figure, at (b) is shown a state in which the write data DWR has an abnormally low frequency. In this state also, in the head voltage HX appear pulses of back electromotive forces in response to and with a slight delay relative to rising and trailing edges in the write data DWR. Here, however, since the write data DWR has a low frequency, pulses of back electromotive forces appear at longer intervals, and therefore the comparison output of the comparator 12 turns to a high level at longer intervals. Accordingly, when the output of the comparator 12 comes to turn to a high level at intervals longer than a predetermined interval, the WUS circuit 15 recognizes that the write data DWR has an abnormally low frequency.

In the figure, at (c) is shown a state in which one end of the head 4 is short-circuited to the supply voltage Vcc. In this state also, in the head voltage HX appear pulses of back electromotive forces in response to and with a slight delay relative to rising and trailing edges in the write data DWR. Here, however, the trailing edges of the back electromotive forces are smaller than under normal conditions, and their peak voltage Vb never drops below the reference voltage Vref. Thus, the output of the comparator 12 remains at a low level all the time. Accordingly, when the output of the comparator 12 comes to remain at a low level, the WUS circuit 15 recognizes that one end of the head 4 is short-circuited to the supply voltage Vcc.

In the figure, at (d) is shown a state in which one end of the head 4 is short-circuited to ground. In this state, the head voltage remains equal to the ground short-circuit voltage Vc, and thus remains below the reference voltage Vref. Thus, the output of the comparator 12 remains at a high level all the time. Accordingly, when the output of the comparator 12 comes to remain at a high level, the WUS circuit 15 recognizes that one end of the head 4 is short-circuited to ground.

In the figure, at (e) is shown a state in which the head 4 is in an open state. In this state, in the head voltage HX appear rectangular pulses in response to the write data DWR. Here, the peak voltage Vd of the trailing edges of the rectangular pulses is lower than the reference voltage Vref, and therefore the output of the comparator 12 turns to a high level on the trailing edges of the rectangular pulses. Here, the rising and trailing edges of the rectangular pulses are slightly delayed relative to the rising and trailing edges in the write data DWR. Therefore, when the output of the comparator 12 is latched on trailing edges in the write data DWR, the latched output does not remain at a low level as under normal conditions. Accordingly, when the latched output is not at a low level, the WUS circuit 15 recognizes that the head 4 is in an open state.

Figure 3:
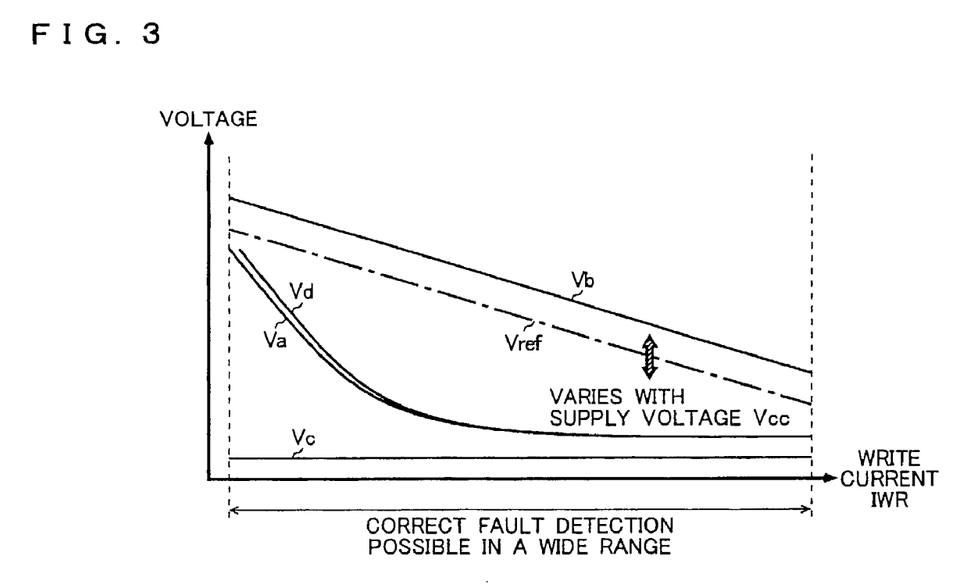
FIG. 3 is a diagram showing the relationship among the head voltages Va to Vd, the reference voltage Vref, and the write current IWR in the embodiment.

The head voltages Va to Vd that appear in the different states described above vary greatly depending on the write current IWR flowing through the head 4 and the supply voltage Vcc as shown in FIG. 3, which will be described later. Therefore, to ensure correct detection of faults in the head 4 all the time irrespective of the write current IWR and the supply voltage Vcc, the reference voltage Vref needs to be varied according to the write current IWR and the supply voltage Vcc.

FIG. 3 is a diagram showing the relationship among the head voltages Va to Vd, the reference voltage Vref, and the write current IWR in this embodiment. In this figure, solid lines Va to Vd respectively represent the voltages Va to Vd shown in FIG. 2. Specifically, Va represents the lower peak voltage of trailing edges that appear in the head voltages HX and HY due to back electromotive forces, and Vb represents the short-circuit voltage that appears when one end of the head 4 is short-circuited to the supply voltage Vcc. Moreover, Vc represents the short-circuit voltage that appears when one end of the head 4 is short-circuited to ground, and Vd represents an open voltage that appears when the head 4 is brought into an open state.

As shown in the figure, the head voltages Va to Vd that appear in the different states all decrease as the write current IWR increases. Therefore, in the FDD apparatus of this embodiment, the reference voltage Vref is so adjusted that the reference voltage Vref decreases as the write current IWR increases, and that the reference voltage Vref is all the time higher than the lower peak voltages Va and Vd of trailing edges in the head voltage HX, lower than the upper peak voltages thereof, and lower than the short-circuit voltage Vb that appears when one end of the head 4 is short-circuited to the supply voltage Vcc.

In this configuration, it never occurs that the short-circuit voltage Vb becomes lower than the reference voltage Vref when the write current IWR becomes larger than a predetermined value, or the peak voltages Va and Vd become higher than the reference voltage Vref when the write current IWR becomes smaller than a predetermined value, as in the conventional configuration (see FIG. 7). Thus, there is no need to separately provide another reference voltage and a circuit for performing comparison based thereon, and nevertheless it is possible to correctly detect faults in the head 4 even when the write current IWR is varied in a wide range Moreover, although not illustrated in the figure, the head voltages Va to Vd that appear in the different states vary also depending on the supply voltage Vcc. Therefore, in the FDD apparatus of this embodiment, the reference voltage Vref is varied according to the supply voltage Vcc. Specifically, as the supply voltage Vcc increases or decreases, the reference voltage Vref is increased or decreased, respectively. In this configuration, it is possible to correctly detect faults in the head 4 even when the supply voltage Vcc varies.

In a configuration where, as in this embodiment, the reference voltage Vref is varied according to the write current IWR and the supply voltage Vcc, there is no need to provide a plurality of fixed reference voltages. This makes it possible to reduce the circuit scale of the write unsafe detection circuit for detecting faults in the inductive head.

Figure 4:
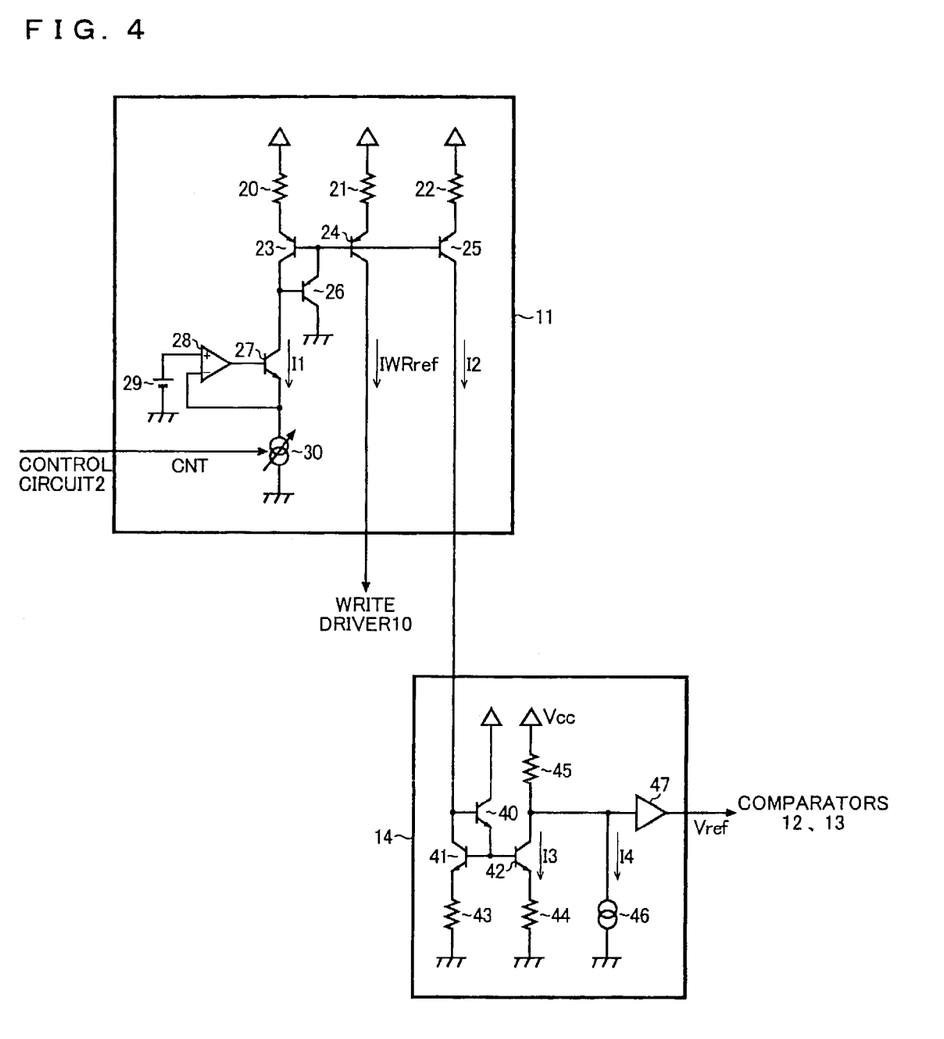
FIG. 4 is a circuit diagram showing an example of the configuration of the write current setting circuit 11 and the reference voltage setting circuit 14.

Next, a practical example of the circuit configuration and the operation of the write current setting circuit 11 and the reference voltage setting circuit 14 will be described. FIG. 4 is a circuit diagram showing an example of the configuration of the write current setting circuit 11 and the reference voltage setting circuit 14.

First, the circuit configuration and the operation of the write current setting circuit 11 will be described. A current mirror circuit is formed by pnp-type transistors 23, 24, and 25, of which the emitters are connected through resistors 20, 21, and 22, respectively, to the supply voltage Vcc. The bases of these transistors are connected together and then connected to the emitter of a pnp-type transistor 26. The transistor 26 has its collector connected to ground, and has it base connected to the collector of the transistor 23 and to the collector of an npn-type transistor 27.

The transistor 27 has its base connected to the output end of an operational amplifier 28, and has its emitter connected to the inverting input terminal (−) of the operational amplifier 28 and also through a constant current source 30, which generates a predetermined constant current I1, to ground. The constant current source 30 receives a control signal CNT from the control circuit 2, and the constant current I1 is varied according to the control signal CNT. To the non-inverting input terminal (+) of the operational amplifier 28, a direct-current voltage source 29 is connected. This stabilizes the constant current I1.

The transistor 24, among those constituting the current mirror circuit, has its collector connected to the write driver 10, so that a control current IWRref proportional to the constant current I1 is fed to the write driver 10. As described earlier, the write current IWR flowing through the head 4 is proportional to the control current IWRref. Therefore, by controlling the constant current I1, it is possible to vary the write current IWR. The transistor 25 has its collector connected to the reference voltage setting circuit 14, so that a current I2 proportional to the constant current I1 (and thus the write current IWR) is fed to the reference voltage setting circuit 14.

Next, the circuit configuration and the operation of the reference voltage setting circuit 14 will be described. A current mirror circuit is formed by npn-type transistors 41 and 42, of which the bases are connected together and then connected to the emitter of an npn-type transistor 40. The emitters of the transistors 41 and 42 are connected through resistors 43 and 44, respectively, to ground. The transistor 40 has its collector connected to the supply voltage Vcc, and has its base connected to the collector of the transistor 41. The node at which the base of the transistor 40 and the collector of the transistor 41 are connected together is connected to the collector of the transistor 25 included in the write current setting circuit 11. Thus, a current I3 proportional to the current I2 (and thus the write current IWR) flows through the collector of the transistor 42.

The collector of the transistor 42 is connected through a resistor 45 to the supply voltage Vcc and also through a constant current source 46, which generates a predetermined constant current I4, to ground. The collector of the transistor 42 serves as the output terminal of the reference voltage setting circuit 14, and is connected through a buffer 47 to the non-inverting input terminals (+) of the comparators 12 and 13. Thus, the reference voltage Vref produced by the reference voltage setting circuit 14 is given by formula (1) below:

$$Vref = Vcc - R \cdot (I3 + I4) \quad (1)$$
$$= Vcc - R \cdot a \cdot IWR - R \cdot I4$$

In formula (1) above, "R" represents the resistance of the resistor 45, and "a" represents a constant of proportionality (I3=a·IWR) that can be adjusted freely by adequately setting the circuit constants of the write current setting circuit 11 and the reference voltage setting circuit 14.

Formula (1) above shows that the reference voltage Vref produced by the reference voltage setting circuit 14 varies according to the write current IWR and the supply voltage Vcc. Moreover, by adequately adjusting the constant of proportionality "a" and the constant current I4 in formula (1) beforehand, it is possible to adjust, as described earlier, the reference voltage Vref in such a way that the reference voltage Vref is all the time higher than the lower peak voltages Va and Vd of trailing edges in the head voltage HX, lower than the upper peak voltages thereof, and lower than the short-circuit voltage Vb that appears when one end of the head 4 is short-circuited to the supply voltage Vcc.

Figure 5A:
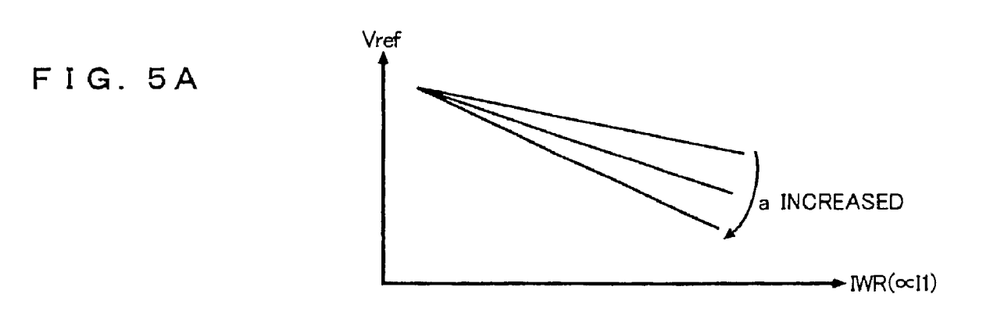
FIGS. 5A and 5B are diagrams showing examples of how the reference voltage Vref is adjusted.
Figure 5B:
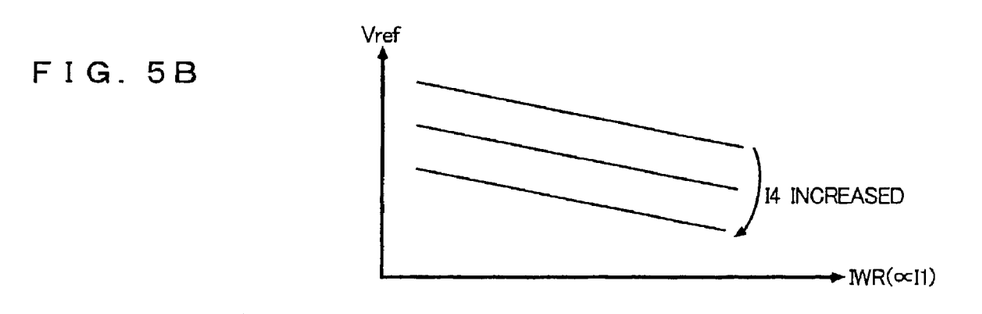

FIGS. 5A and 5B are diagrams showing examples of how the reference voltage Vref is adjusted. As shown in FIG. 5A, by arbitrarily setting the circuit constants of the write current setting circuit 11 and the reference voltage setting circuit 14 and adjusting the constant of proportionality "a," it is possible to adjust the rate of change (gradient) of the reference voltage Vref with respect to the write current IWR. Specifically, as the constant of proportionality "a" is increased, the reference voltage Vref comes to vary more steeply with respect to the write current IWR. Moreover, as shown in FIG. 5B, by adjusting the constant current I4, it is possible to adjust the absolute value of the reference voltage Vref. Specifically, as the constant current I4 is increased, the absolute value of the reference voltage Vref becomes lower.

It is to be understood that, although the embodiment described above deals with an example in which the present invention is applied to an FDD apparatus, the present invention may be implemented in any other manner than specifically described above. For example, the present invention finds wide application in magnetic recording apparatus in which faults in an inductive head are detected on the basis of the result of comparison between a head voltage and a predetermined reference voltage.

What is claimed is:

1. A magnetic recording apparatus comprising:
   a head for recording information on a magnetic recording medium;
   a write current setting circuit for controlling a write current that is passed through the head;
   a fault detection circuit for detecting a fault in the head based on a result of comparison between head voltages appearing at both ends of the head and a reference voltage; and a reference voltage setting circuit for varying the reference voltage according to the write current, wherein the reference voltage is so controlled as to be always higher than a peak voltage of a trailing edge that appears in the head voltages and lower than a short-circuit voltage that appears when one end of the head is short-circuited to a supply voltage.

2. A magnetic recording apparatus as claimed in claim 1, wherein the reference voltage setting circuit passes a current proportional to the write current through a resistor of which one end is connected to a supply voltage so that the reference voltage is obtained at another end of the resistor.

3. A magnetic recording apparatus as claimed in claim 2, wherein to the other end of the resistor are connected a first current source that passes a current proportional to the write current through the resistor and a second current source that passes a current fixed at a predetermined value through the resistor.

4. A magnetic recording apparatus comprising:
an inductive head for recording information on a magnetic recording medium;
a write current setting circuit for controlling a write current that is passed through the inductive head;
a write driver circuit for switching a direction of the write current according to write data fed thereto;
a comparator circuit for comparing head voltages appearing at both ends of the inductive head with a reference voltage so as to output a comparison signal that is turned to a high level when the head voltages are lower than the reference voltage and to a low level when the head voltages are higher than the reference voltage;
a write unsafe detection circuit for detecting a fault in the inductive head based on the comparison signal; and
a reference voltage setting circuit for varying the reference voltage according to the write current,
wherein the reference voltage is so controlled as to be always higher than a peak voltage of a trailing edge that appears in the head voltages and lower than a short-circuit voltage that appears when one end of the head is short-circuited to a supply voltage.

5. A magnetic recording apparatus as claimed in claim 4, wherein the reference voltage setting circuit comprises:
a first current source for producing a mirror current that is proportional to the write current; and
a resistor of which one end is connected to a supply voltage and of which another end is connected to the first current source,
wherein the mirror current is passed through the resistor so that the reference voltage is obtained at the other end of the resistor.

6. A magnetic recording apparatus as claimed in claim 5, wherein the reference voltage setting circuit further comprises:
a second current source connected to the other end of the resistor so as to pass a current fixed at a predetermined value through the resistor.

7. A magnetic recording apparatus as claimed in claim 4, wherein, when the comparison signal turns to a high level at intervals longer than a predetermined interval, the write unsafe detection circuit recognizes that a low frequency fault has occurred in the write data.

8. A magnetic recording apparatus as claimed in claim 4, wherein, when the comparison signal remains at a low level, the write unsafe detection circuit recognizes that one end of the inductive head is short-circuit to the supply voltage.

9. A magnetic recording apparatus as claimed in claim 4, wherein, when the comparison signal remains at a high level, the write unsafe detection circuit recognizes that one end of the inductive head is short-circuit to ground.

10. A magnetic recording apparatus as claimed in claim 4, wherein the write unsafe detection circuit latches the comparison signal on a trailing edge in the write data and, if a latched output is not at a low level, recognizes that the inductive head is in an open state.

* * * * *